United States Patent [19]

Fenske et al.

[11] Patent Number: 4,846,107

[45] Date of Patent: Jul. 11, 1989

[54] AQUA-CULTIVATION APPARATUS AND METHOD

[76] Inventors: Horst Fenske, 6104 Jugenheim/Bergstr., Im Saebchen 1; Karl G. Preis, Hauptstrabe 7, 6761 Bayerfeld, both of Fed. Rep. of Germany

[21] Appl. No.: 93,594

[22] Filed: Sep. 8, 1987

[30] Foreign Application Priority Data

Dec. 13, 1986 [DE] Fed. Rep. of Germany ....... 3642733

[51] Int. Cl.⁴ .............................................. A01K 63/00
[52] U.S. Cl. ...................................................... 119/3
[58] Field of Search .................................... 119/3, 2, 4

[56] References Cited

U.S. PATENT DOCUMENTS

| | | |
|---|---|---|
| 31,657 | 3/1861 | Cutting .................................... 119/5 |
| 2,652,807 | 9/1953 | Washburn ................. 119/3 |
| 4,052,960 | 10/1977 | Birkbeck et al. ....................... 119/3 |
| 4,182,268 | 1/1980 | Berger ..................... 119/3 |
| 4,357,902 | 11/1982 | Sheldon et al. ..................... 119/3 X |

Primary Examiner—Robert P. Swiatek
Attorney, Agent, or Firm—Thomas L. Adams

[57] ABSTRACT

This apparatus can aqua-cultivate respective plant or animal varieties in fresh or sea water. The apparatus includes a reservoir having an inlet and outlet for containing the fresh or sea water together with the respective plants or animal varieties. A filter is coupled between the inlet and outlet in order to circulate and filter the water. A compressed air facility is coupled to the reservoir for increasing the pressure within it. Measurement instruments are coupled to the reservoir for providing a state signal signifying the state of the water in the reservoir.

23 Claims, 2 Drawing Sheets

AQUA-CULTIVATION APPARATUS AND METHOD

BACKGROUND OF THE INVENTION

The present invention relates to an aqua-cultivation apparatus and methods and, in particular, to systems simulating the proper sea environment for optimum breeding and cultivation of plant or animal varieties in fresh and sea water.

For nutrient-economical reasons, aqua-cultivation has become more important throughout the world. As it has been previously very difficult to cultivate sea water fish in an aquarious environment, as well as all accompanying low-born animals, seaweed and the complete micro fauna.

Sea water ornamental fish have been angled so intensely at a great number of coral reefs have been merely cleared. Due to this fact, several countries have already stopped angling and exporting of sea water ornamental fish by law. As a high percentage of the fish caught in the oceans already dies during transportation, there is a great demand for sea water ornamental fish. Merchants try to equalize the losses occurring through transportation by new imports. Thus there is a great demand for sea water ornamental fish and a need to cultivate these fish in order to preserve these natural reefs.

This invention is based on the knowledge that in the future, this ruthless exploitation of the biological circuits of the oceans must be replaced by the breeding of ornamental fish by means of aqua-cultivation.

Previous attempts at aqua-cultivation have been impeded by a great number of fish diseases that have been invincible up to now. A preferred embodiment of this invention will reduce the risk of such diseases by providing an excellent environment for the cultivation and breeding of ornamental fish and other sea life. This invention is a step toward perfecting the cultivation of both deep sea and ornamental fish on the largest possible scale.

After millions of years of evolution, all sea plants and creatures depend on the osmotic processes taking place in a water depth not normally provided in common aquatic tanks. It must be recognized that osmosis at a depth of 10 m is different than that at a depth of 10 cm. This invention provides an alternative whereby the osmosis process can be carried out in the tank just as it would be in the natural environment. An increased and continuously higher static pressure is proposed for simulating the conditions existing in nature and creating the important and advantageous conditions needed for the breeding and cultivating of sea organisms.

Known aquarium tank systems fail to make proper accommodations for deep sea fish. These known systems comprise an open top design, which allows oxygen and other gases to escape. These systems, in failing to simulate a deep sea environment, hinder the osmotic processes of the organisms within the tank. These known open top systems facilitate several fish diseases and make it difficult to cultivate sea water fish, low-born animals, seaweed and the complete micro fauna.

The aim of this invention is to correct these disadvantages and to propose conditions for aqua cultivation, showing new ways for a perfect and uninterrupted cultivation of fish as well as of ornamental fish on the largest possible scale.

The concentration of gaseous oxygen under hydrostatic pressure is different than the concentration without hydrostatic pressure. The opening of a bottle filled with soda-water shows, for example, that dissolved carbon dioxide in the closed bottle escapes upon opening as sparkling gas bubbles. It is proposed herein to create a preferred hydrostatic situation and effectuate the desired concentration of gaseous oxygen within the water. Water under pressure in a closed aquarium can absorb an amount of atmospheric oxygen which is identical to natural conditions. But if the aquarium is open, only approximately 60% of the atmospheric oxygen would be absorbed. Such an open aquarium facilitate several fish diseases as well as the propagation of flagellates which cannot endure an oxygen surplus. Persons involved in sea water aquaristics know about the negative effects caused by flagellates such as Ichthyophtirius, Oodinium and Cryptocaryon.

Accordingly, there is a need for a system which simulates deep sea conditions through a constant supply of compressed air thus creating an optimum environment for aqua cultivation and decreasing the risk of fish diseases.

SUMMARY OF THE INVENTION

In accordance with the illustrative embodiments demonstrating features and advantages of the present invention, there is provided an apparatus for aqua-cultivation of respective plant and animal varieties in fresh or sea water. The apparatus includes a reservoir having an inlet and outlet for containing the fresh or sea water together with the respective plant or animal varieties. The apparatus also includes filter means coupled between the inlet an outlet for circulating and filtering the water. There also exists a pressure means coupled to the reservoir for increasing the pressure within the reservoir. A measurement means coupled to the reservoir can provide state signal signifying the state of the water in the reservoir.

According to the principles of the same invention, a novel method is provided for performing aqua-cultivation. The method employs a reservoir with an inlet and outlet and containing fresh or sea water, together with respective plant or animal varieties. The method includes the step of circulating the water in the reservoir through the inlet and outlet. Another step is continuously applying compressed air to said reservoir. Another step in the method is measuring a state of the water in the reservoir.

By employing such apparatus and methods, an aqua cultivation system is achieved which utilizes compressed air to create an environment conducive to the breathing and cultivation of the various species of plants and animals from fresh and sea water. In the preferred embodiment of this invention, it is proposed to fill a partially transparent reservoir with fresh or sea water, together with the respective plants and/or varieties of animals. The water in this reservoir is directed in an endless circuit through two openings in its side by a pump working through an aggregate filter.

A compressed air connection in the side of the reservoir will continuously provide compressed air of approximately 0.01–50 bar, which will be drained by an excess pressure valve placed in the side of the reservoir.

It is preferred that the various entropies of the cultivating water are controlled with measuring instruments such as manometers, thermometers, oxygen voluminometers, etc. It is recommended that to fix such measuring instruments to a face of the reservoir. In the preferred embodiment, it is recommended to keep the cultivated water at a constant temperature by means of a thermostat and a heater.

The fresh or sea water in a closed or partially transparent reservoir can be is locked by a pressurized cover. The water should, preferably, be moved out of the reservoir by a compression pump/aggregate filter through a lower water drain opening, returning by an inlet connection. Appropriate for this purpose is the use of pressurized, lockable, round covers which screw into the top of the reservoir. Compressed air must be fed to the reservoir continuously and must be drained through an excess pressure valve, which is fixed to a face of the reservoir.

Due to the constant supply of compressed air, the static pressure of the cultivated water is increased. Consequently, all osmotic processes on the surfaces of the organisms are the same as in the natural environment. The use of the compressed air system in this invention creates within the preferred tank a assimilated deep sea environment. This simulation is conducive to the osmosis process to which deep-sea plants and animals have adapted.

BRIEF DESCRIPTION OF THE DRAWINGS

The above description as well as other objects, features and advantages of the present invention will be more fully understood by reference to the following detailed description of presently preferred but nonetheless illustrative embodiments in accordance with the present invention when taken in conjunction with the accompanying drawings wherein.

DETAILED DESCRIPTION OF THE PREFERRED EMBODIMENTS

Figure 1:
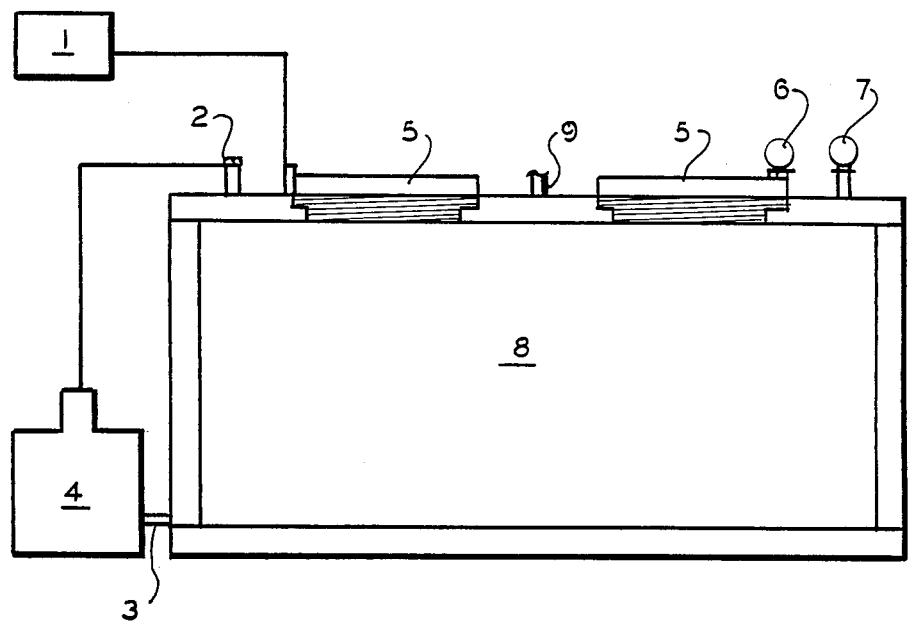
FIG. 1 is an elevational view of a rectangular reservoir according to the principles of the present invention.
Figure 2:
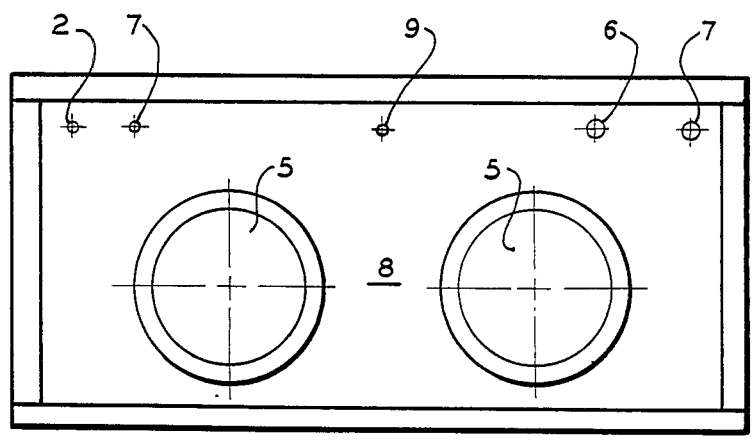
FIG. 2 is the top view of the rectangular reservoir of FIG. 1.

Referring to FIGS. 1 and 2, an aqua-cultivation apparatus is shown employing a six- sided, closed, rectangular reservoir 8 which is used to hold the water and sea life. This closed rectangular reservoir 8 should be at least partially transparent and can best be constructed with plastic, glass or with plate metal utilizing windows. FIG. 1 also shows round covers 5 which screw into place a top the rectangular reservoir 8 and thus provide an air-tight seal. A source of compressed air 1 connects to a part atop reservoir 8 to increase the air pressure within the closed rectangular reservoir 8. Source 1 can provide a air pressure in the range of 0.01 to 50 bar, if this is consistent with the life form in reservoir 8. An excess pressure valve 7 is fixed atop tank 8 to relieve and regulate air pressure created within the tank. This excess pressure valve 7 makes it possible to regulate the air pressure in the air tight rectangular reservoir to a pressure equivalent to a desired deep sea environment.

Compression pump/aggregate filter 4 provides a filter means by which water within the tank is both circulated and filtered. This is achieved through inlet 2 and drain 3 as shown in FIG. 1. Specifically, inlet 2 is a pump connection opening which carries filtered water into reservoir 8. Drain 3 is the water drain opening which in turn carries the water from reservoir to the pump/ aggregate filter 4. The capacity of pump is sufficient to remove solid waste so that the environment of reservoir 8 remain habitable. Thus the pump volume varies to suit the volume of water and the tolerance of the specie in reservoir 8.

Various measuring devices are mounted on reservoir 8. Thus, shown is thermometer 9 as well an manometer 6. These two devices indicate the parameters which are preferably monitored in side reservoir 8. Of course other parameters can be measure as well.

Figure 3:
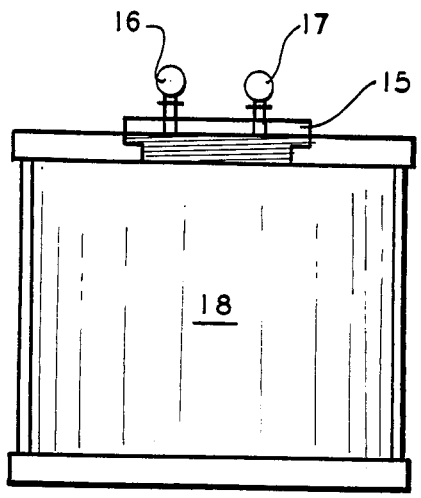
FIG. 3 is an elevational view of a cylindrical reservoir which is an alternate to that of FIG. 1.
Figure 4:
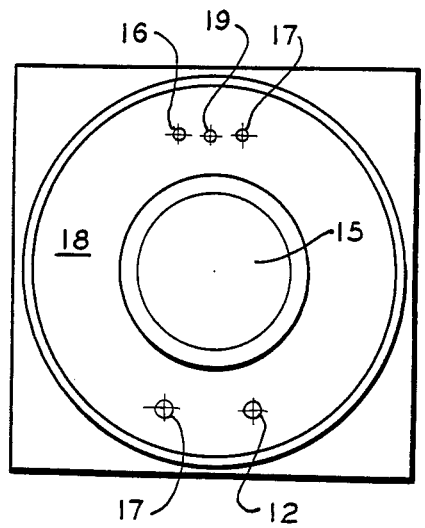
FIG. 4 is a top view of the cylindrical reservoir of FIG. 3.

Referring to FIGS. 3 and 4, aqua-cultivation apparatus is shown as cylindrical reservoir 18. In this drawing, components corresponding to components in FIG. 1 have the same reference numeral but increased by ten. This arrangement is shown with a round top and side and a rectangular base.

To facilitate an understanding of the principles associated with the foregoing apparatus, its operation will now be briefly described. Referring to FIGS. 1 and 2, reservoir 8 may be filled with sea or fresh water. The desired species of plants and/or animals are then placed into reservoir 8 through the openings vacated by covers 5. Covers 5 are then firmly screwed into the openings, thus creating an air tight seal.

Compressed air source 1 increases air pressure within reservoir 8 eventually reaching a point simulating the pressure conditions in a given deep sea environment. Thereafter, excess pressure valve 7 then operates to regulate the pressure within the reservoir 8. Valve 7 thus allows the pressure to simulate a desired water depth and specific environmental conditions.

The pump/aggregate filter 4 draws water through drain opening 3, then filtering and returning the water out through pump connection 2. Thus the conditions of reservoir 8 are such that there is a continuous application of compressed air as well as a continuous filtering of the water.

In the preferred embodiment of this invention, there is also employed at least one measuring instrument such as a manometer, thermometer, oxygen voluminometers or other such devices. It is with the use of these measuring devices that the environment within the reservoir can be accurately monitored to keep the conditions within the desired level.

The use of at least one pressurized, lockable cover ensures that the conditions within the reservoir 8 may be maintained as desired. For instance, valve 7 allows the pressure within the tank to be maintained at a certain desired level. The other monitoring devices such as thermometer may be used to monitor the conditions of the tank and for example regulate a heater (not shown) to keep the water at a desired temperature.

Such aqua-cultivation apparatus also allows for transporting of the entire reservoir 8 and for keeping respective plants or animal varieties in the reservoir 8 while it is being transported.

This reservoir 8 should be at least partially transparent and in fact may be lighted so that the animals or fish receive an environmentally proper amount of light and also remain viewable.

Also, a larger tank may be taken aboard a ship involved in retrieving the desired animal or plant species. The species may be captured and then lowered into this larger tank. The tank is then sealed and the species transported back to the shore. The species of plants or animals may be moved from the larger tank into a smaller, more easily serviced tanks.

It may also be desirable to use very large tanks in conjunction with large scale operations and this invention could be easily adjusted to serve a very large project. In the same manner, the invention could be scaled down to allow for much smaller operations, designed to lengthen the life of a smaller number of tropical sea fish, which are normally endangered by the commonly used, open topped aquatic tanks.

It is to be appreciated that various modifications may be implemented with respect to the above described embodiment. For example, various materials may be used to construct reservoir 8. The only requirement is that the reservoir be at least partially transparent. This allows for various types of construction materials, whereby depending on the size and shape, different methods of construction may be utilized. The tank may also be of metal construction with the sides either welded or bolted, with metal construction another transparent material should be utilized as a window. There are also variations involving the covers and valve. The disclosed embodiments used one or two covers, but the number of covers can vary as desired. The covers may be either of a transparent material for viewing or constructed of an opaque material. These covers are shown in the preferred embodiment as screw-on covers, however, as long as they achieve the desired pressurize effect, they be attached in any manner. There is great latitude with respect to the types of monitoring devices which are to be used in conjunction with this invention. In the preferred environment these monitoring devices may be attached to the top of the tank but, when appropriate, they may also be attached to the sides. There is virtually no limit to the types of monitoring devices that can be utilized in conjunction with this tank, only the appropriateness for the project for which it is being used. The size and shape of the tank can obviously be modified in several ways in cylindrical form.

What is claimed is:

1. A method for aqua-cultivation, employing a reservoir with an inlet and outlet and containing fresh or sea water together with respective plant or animal varieties, comprising the steps of:
   circulating the water in said reservoir through said inlet and outlet;
   filtering the water drawn from said outlet;
   continually injecting fresh compressed air into said reservoir to replace air already in said reservoir for keeping the pressure therein elevated above ambient pressure; and
   measuring a state of the water in said reservoir.

2. A method for aqua-cultivation, according to claim 1, wherein said applying of said compressed air occurs at one point, and comprising the step of: venting at another point the air in said reservoir.

3. A method for aqua-cultivation, according to claim 2, wherein said reservoir has an attachment point, and employing at least one measuring instrument such as manometers, thermometers, oxygen voluminometers etc., and comprising the step of:
   measuring a state variable of said water with said measuring instrument attached at said attachment point.

4. A method for aqua-cultivation, according to claim 3, wherein said reservoir includes at least one pressurized lockable cover, comprising the step of:
   placing said respective plants or animal varieties in said reservoir; and
   locking said cover on said reservoir.

5. A method for aqua-cultivation, according to claim 4, comprising the step of:
   heating said water to keep it at a constant temperature.

6. A method for aqua-cultivation, according to claim 2, comprising the step of:
   venting the air from said reservoir to keep it at a constant pressure.

7. A method for aqua-cultivation, according to claim 6, comprising the step of:
   venting the air from said reservoir to keep said constant pressure at a magnitude to establish a predetermined concentration of oxygen in said water, so that the oxygen concentration of a given marine environment at a given depth can be simulated.

8. A method for aqua-cultivation, according to claim 7, comprising the step of:
   keeping said respective plants or animal varieties in said reservoir throughout most of their adolescence.

9. A method for aqua-cultivation, according to claim 8, comprising the step of:
   transporting said reservoir,; and
   keeping said respective plants or animal varieties in said reservoir while it is being transported.

10. A method for aqua-cultivation, according to claim 1, wherein said reservoir is at least partially transparent, comprising the step of:
    lighting the interior of said reservoir by transmitting light through it.

11. Apparatus for aqua-cultivation of respectie plant or animal varieties in fresh or sea water, comprising:
    a reservoir having an inlet and outlet for containing air and the fresh or sea water together with the respective plant or animal varieties;
    filter means coupled between said inlet and outlet for circulating said water and filtering it;
    pressure means coupled to said reservoir for continually injecting fresh pressurized air to replace air already in said reservoir to keep the pressure within said reservoir elevated above ambient pressure; and
    measurement means coupled to said reservoir for providing a state signal signifying a state of the water in said reservoir.

12. Apparatus for aqua-cultivation according to claim 11, wherein said pressure means is operable to keep the pressure in said reservoir at a predetermined constant value.

13. Apparatus for aqua-cultivation according to claim 12, wherein said reservoir is at least partially transparent and wherein said reservoir includes a tank and a cover lockable on said tank for making a gas-tight seal.

14. Apparatus for aqua-cultivation according to claim 13, wherein said reservoir has an inlet and outlet and wherein said filter means comprises:
    an aggregate filter; and
    a pump serially connected with said aggregate filter between said inlet and outlet for circulating and filtering said water.

15. Apparatus for aqua-cultivation according to claim 14, wherein said reservoir has a perforation and wherein said measurement means is mounted in said perforation.

16. Apparatus for aqua-cultivation according to claim 12, further comprising:

thermostatic means for regulating the temperature of the water in said reservoir.

17. Apparatus for aqua-cultivation according to claim 12, wherein said measurement means comprises:
means for measuring one of the reservoir parameters from the group consisting of temperature, pressure, or oxygen concentration.

18. Apparatus for aqua-cultivation according to claim 17, wherein said reservoir includes:
a tank having a circular aperture; and
a gas-tight, lockable cover for mounting in said circular aperture of said tank.

19. Apparatus for aqua-cultivation according to claim 11 and supplied with compressed air from an air supply, said reservoir comprising:
vent for relieving excess pressure in said reservoir.

20. Apparatus for aqua-cultivation according to claim 19, wherein said vent means comprises a relief valve.

21. Apparatus for aqua-cultivation according to claim 20, wherein said reservoir includes a tank and a cover lockable on said tank for making a gas-tight seal.

22. Apparatus for aqua-cultivation according to claim 20, in said reservoir is at least partially transparent.

23. Apparatus for aqua-cultivation according to claim 11, wherein said reservoir is at least partially transparent.

* * * * *